United States Patent Office 3,163,507
Patented Dec. 29, 1964

3,163,507
GAS TURBINE FUELS
Hugo Stange, Niagara Falls, N.Y., assignor, by mesne assignments, to Olin Mathieson Chemical Corporation, a corporation of Virginia
No Drawing. Filed Sept. 26, 1955, Ser. No. 536,778
5 Claims. (Cl. 44—74)

This invention relates to new compositions of matter which are useful as fuels.

Pentaborane-9 can be used as a fuel, possessing advantages in that it is a liquid and also in that it has a very high net heat of combustion (29,200 B.t.u. per pound). However, certain unsatisfactory properties limit the utility of pentaborane for practical purposes. Thus, it has a high vapor pressure, low spontaneous ignition temperature and high toxicity. It would be well, therefore, to have available for use fuels which possess, at least to a certain extent, the high net heat of combustion possessed by pentaborane and at the same time of reduced vapor pressure, decreased spontaneous ignition temperature and lower toxicity.

In an effort to provide the art with improved fuels containing pentaborane, a great many chemical compounds have been admixed with pentaborane and the properties of the mixtures determined. The problem of discovering chemical compounds which can suitably be admixed with pentaborane to provide a useful fuel is not a simple one, however. Thus, many compounds are insoluble in pentaborane, and others are reactive with it. Moreover, many compounds, even though they form homogeneous solutions with pentaborane and do not react with it, yield solutions having an unexpectedly high vapor pressure, rendering them undesirable for use in pentaborane mixtures.

In accordance with the present invention, it has been discovered that a relatively small group of materials can be admixed with pentaborane to provide homogeneous mixtures which are characterized by an unexpectedly low vapor pressure, so that they can suitably be used in admixture with pentaborane. These materials are toluene, ethylbenzene, styrene and N,N-dimethylaniline, so that the present invention contemplates compositions of matter which are suitable for use as fuels and which consist essentially of a mixture of from 75 to 30 weight percent of pentaborane and from 25 to 70 weight percent of toluene, ethylbenzene, styrene or N,N-dimethylaniline or mixtures of those compounds.

EXAMPLE I

Approximately five grams of Merck reagent grade toluene was placed in a weighing bulb which was fitted with a standard taper glass joint for attaching to a vacuum line. The contents of the bulb were frozen with liquid nitrogen. When the bulb was thoroughly evacuated, the stopcock was closed and the bulb was detached from the line. After warming to room temperature, the bulb was weighed on an analytical balance. The bulb was re-attached to the line and a small amount of toluene was allowed to distill into the vacuum line. Another weighing of the bulb was made. The amount of toluene in the line was 0.3705 g. (0.004 mole or 90 ml. of gas at S.T.P.).

A tank of pentaborane was attached to the vacuum line and approximately 10 g. of material was allowed to distill into the line. The vapor pressure of the pentaborane was 67.9 mm. at 0° C. (reported: 66.5 mm. at 0° C.). The pentaborane was vacuum pumped for a short interval while surrounded by a bath at 0° C. The vapor pressure was then 66.7 mm. at 0° C. This was considered sufficiently pure for use in the experiment.

In order to make a mixture with a composition of 50 mole percent pentaborane, 90 ml. of pentaborane at S.T.P. was needed. Calculations showed that this amount of gas exerts a pressure of 63.2 mm. at 27° C. in a constant-volume system of 1190 ml. The pentaborane storage trap was opened to this system. When a pressure of 63.2 was reached, the system was closed off. The pentaborane remaining in the line was returned to storage. The pentaborane was condensed upon the toluene and the mixture was allowed to come to room temperature and to stand for one hour. The trap was then surrounded by a water-ice bath at 0° C. The vapor pressure was read on a mercury column by means of a cathetometer. The vapor pressure at this temperature was 34.2 mm.

Another portion of pentaborane was measured out in the same manner. A pressure of 126.4 mm. was allowed in the constant-volume system of 1190 ml. This represented 180 ml. of gas at S.T.P. The additional pentaborane was added to the previous 50–50 mole percent mixture. The composition at this point was 75 mole percent pentaborane and 25 mole percent toluene. The vapor pressure of this mixture was 48.4 mm. at 0° C. The material was distilled into a trap at the seal-off system and discarded.

Similar experiments were conducted in which the toluene was replaced by ethylbenzene, styrene and N,N-dimethylaniline. The results obtained in these experiments, as well as in experiments using various other materials in admixture with the pentaborane, are set forth in Table I.

Table 1

VAPOR PRESSURES AT 0° C., AND ESTIMATED HEATS OF COMBUSTION OF BINARY PENTABORANE-9 SOLUTIONS

| Second Component | Mole Percent | Weight Percent | $P_{mm.}$ 0° C., Calculated | $P_{mm.}$ 0° C., Observed | $\Delta H$ Combustion [a] Net, B.t.u./lb. |
|---|---|---|---|---|---|
| Toluene | 50 | 59 | 37 | 34 | 22,200 |
|  | 25 | 33 | 52 | 48 | 25,400 |
| Dimethylaniline | 50 | 66 | 34 | 28 | 20,600 |
|  | 27 | 41 | 49 | 44 | 23,350 |
| Ethylbenzene | 50 | 63 | 37 | 35 | 21,950 |
|  | 25 | 36 | 52 | 50 | 25,050 |
| Benzene | 50 | 55 | 46 | 46 | 22,600 |
|  | 25 | 29 | 56 | 57 | 25,700 |
| Styrene | 50 | 62 | 34 | 32 | 21,800 |
|  | 25 | 36 | 50 | 49 | 25,000 |
| Decaborane | 6 | 11 | 63 | 58 | 29,100 |
|  | 11 | 19 | 60 | 56 | 28,950 |
| JP-4 |  | 51 | 31 | 49 | 23,800 |
| Xylene (mixed) | 50 | 63 | 35 | 36 | 21,900 |
|  | 26 | 37 | 50 | 52 | 24,900 |

[a] Based on the heats of combustion of the components.

The compositions of this invention can be employed as fuels when burned with air. Thus, they can be used as fuels in basic and auxiliary combustion systems in gas turbines, particularly aircraft gas turbines of the turbojet or turboprop type. Each of those types is a device in which air is compressed and fuel is then burned in a combustor in admixture with the air. Following this, the products of combustion are expanded through a gas turbine. The products of this invention are particularly suited for use as a fuel in the combustors of aircraft gas turbines of the types described in view of their improved energy content, combustion efficiency, combustion stability, flame propagation, operation limits and heat release rates over fuels normally used for these applications.

The combustor pressure in a conventional aircraft gas turbine varies from a maximum at static sea level conditions to a minimum at the absolute ceiling of the aircraft, which may be 65,000 feet or 70,000 feet or higher. The compression ratios of the current and near-future aircraft gas turbines are generally within the range frm 5:1 to 15: or 20:1, the compression ratio being the absolute pressure of the air after having been compressed (by the compressor in the case of the turbojet or turboprop engine) divided by the absolute pressure of the air before compression. Therefore, the operating combustion pressure in the combustor can vary from approximately 90 to 300 pounds per square inch absolute at static sea level conditions to about 5 to 15 pounds per square inch absolute at the extremely high altitudes of approximately 70,000 feet. The products of this invention are well adapted for efficient and stable burning in combustors operating under these widely varying conditions.

In normal aircraft gas turbine practice it is customary to burn the fuel, under normal operating conditions, at overall fuel-air ratios by weight of approximately 0.012 to 0.020 across a combustion system when the fuel employed is a simple hydrocarbon, rather than a borohydrocarbon of the present invention. Excess air is introduced into the combustor for dilution purposes so that the resultant gas temperature at the turbine wheel in the case of the turbojet or turboprop engine is maitnained at the tolerable limit. In the zone of the combustor where the fuel is injected the local fuel-air ratio is approximately stoichiometric. This stoichiometric fuel to air ratio exists only momentarily, since additional air is introduced along the combustor and results in the overall ratio of approximately 0.012 to 0.020 for hydrocarbons before entrance into the turbine section. For the higher energy fuels of the present invention, the local fuel to air ratio in the zone of fuel injection should also be approximately stoichiometric, assuming that the boron carbon and hydrogen present in the products burn to boric oxide, carbon dioxide and water vapor. In the case of the 67 weight percent pentaborane-33 weight percent toluene mixture, for example, this local fuel to air ratio by weight is approximately 0.070. For the higher energy fuels of the present invention, because of their higher heating values in comparison with the simple hydrocarbons, the overall fuel-air ration by weight across the combustor will be approximately 0.007 to 0.014 if the resultant gas temperature is to remain within the presently established tolerable temperature limits. Thus, when used as the fuel supplied to the combustor of an aircraft gas turbine engine, the products of the present invention are employed in essentially the same manner as the simple hydrocarbon fuel presently being used. The fuel is injected into the combustor in such manner that there is established a local zone where the relative amounts of fuel and air are approximately stoichiometric so that combustion of the fuel can be reliably initiated by means of an electrical spark or some similar means. After this has been done, additional air is introduced into the combustor in order to cool sufficiently the products of combustion before they enter the turbine so that they do not damage the turbine. Present-day turbine blade materials limit the turbine inlet temperature to approximately 1600–1650° F. Operations at these peak temperatures is limited to periods of approximately five minutes at take-off and climb and approximately 15 minutes at combat conditions in the case of military aircraft. By not permitting operation at higher temperatures and by limiting the time of operation at peak temperatures, satisfactory engine life is assured. Under normal crusing conditions for the aircraft, the combustion products are sufficiently diluted with air so that a temperature of approximately 1400° F. is maintained at the turbine inlet.

It is claimed:

1. A composition of matter suitable for use as a fuel consisting essentially of a mixture of 75 to 30 weight per cent of pentaborane-9 and 25 to 70 weight percent of at least one compound selected from the group consisting of toluene, ethylbenzene, styrene and N,N-dimethylaniline.

2. The composition of claim 1 wherein said compound is toluene.

3. The composition of claim 1 wherein said compound is ethylbenzene.

4. The composition of claim 1 wherein said compound is styrene.

5. The composition of claim 1 wherein said compound is N,N-dimethylaniline.

No references cited.